(12) United States Patent
Iizuka et al.

(10) Patent No.: US 8,147,372 B2
(45) Date of Patent: Apr. 3, 2012

(54) AUTOMATIC TRANSMISSION

(75) Inventors: Kohei Iizuka, Wako (JP); Noriaki Saitoh, Wako (JP); Soichi Sugino, Wako (JP); Mirko Leesch, Thum (DE); Joerg Mueller, Chemnitz (DE); Rico Resch, Wilsdruff (DE)

(73) Assignee: Honda Motor Co., Ltd., Tokyo (JP)

( * ) Notice: Subject to any disclaimer, the term of this patent is extended or adjusted under 35 U.S.C. 154(b) by 68 days.

(21) Appl. No.: 12/829,400

(22) Filed: Jul. 2, 2010

(65) Prior Publication Data

US 2011/0009227 A1 Jan. 13, 2011

(30) Foreign Application Priority Data

Jul. 8, 2009 (JP) ................. 2009-161877

(51) Int. Cl.
*F16H 3/62* (2006.01)
(52) U.S. Cl. .................................... 475/276
(58) Field of Classification Search ............. 475/276, 475/281, 283, 291
See application file for complete search history.

(56) References Cited

U.S. PATENT DOCUMENTS

| | | | |
|---|---|---|---|
| 2004/0053733 A1* | 3/2004 | Bucknor et al. | 475/276 |
| 2004/0102279 A1* | 5/2004 | Lee et al. | 475/276 |
| 2004/0132575 A1* | 7/2004 | Lee et al. | 475/276 |
| 2006/0148610 A1* | 7/2006 | Usoro et al. | 475/276 |
| 2009/0069143 A1* | 3/2009 | Seo | 475/276 |

FOREIGN PATENT DOCUMENTS

| | | |
|---|---|---|
| JP | 2000-161450 | 6/2000 |
| JP | 2002-323098 | 11/2002 |
| JP | 2005-273768 | 10/2005 |

* cited by examiner

*Primary Examiner* — Edwin A Young
(74) *Attorney, Agent, or Firm* — Ditthavong Mori & Steiner, P.C.

(57) ABSTRACT

An automatic transmission includes a first single-pinion planetary gear mechanism including a first sun gear, a first ring gear, and a first carrier that respectively correspond to first to third elements in a velocity diagram. A second single-pinion planetary gear mechanism includes a second sun gear, a second ring gear, and a second carrier that respectively correspond to fourth to sixth elements in a velocity diagram. The fourth element is connected to the first element to form a first connected body. A double-pinion third planetary gear mechanism includes a third sun gear, a third ring gear, and a third carrier that respectively correspond to seventh to ninth elements in a velocity diagram. The ninth element is connected to the third element to form a second connected body. The eighth element is connected to the fifth element to form a third connected body.

6 Claims, 3 Drawing Sheets

FIG. 3

|  | C1 | C2 | C3 | B1 | B2 | B3 | F1 | GEAR RATIO | STEP RATIO |
|---|---|---|---|---|---|---|---|---|---|
| Rev |  | ○ | ○ | ○ |  |  |  | 2.101 | 61.5% |
| 1 |  |  | ○ | (○) | ○ |  | ○ | 3.416 | 1.550 |
| 2 |  | ○ | ○ |  | ○ |  |  | 2.203 | 1.208 |
| 3 | ○ |  | ○ |  | ○ |  |  | 1.823 | 1.313 |
| 4 | ○ | ○ |  |  | ○ |  |  | 1.388 | 1.388 |
| 5 | ○ | ○ | ○ |  |  |  |  | 1.000 | 1.200 |
| 6 | ○ | ○ |  |  |  | ○ |  | 0.834 | 1.288 |
| 7 | ○ |  | ○ |  |  | ○ |  | 0.647 | 1.336 |
| 8 |  | ○ | ○ |  |  | ○ |  | 0.484 | 7.053 |

AUTOMATIC TRANSMISSION

CROSS REFERENCES TO RELATED APPLICATIONS

The present application claims priority under 35 U.S.C. §119 to Japanese Patent Application No. 2009-161877, filed Jul. 8, 2009, entitled "Automatic Transmission." The contents of this application are incorporated herein by reference in their entirety.

BACKGROUND OF THE INVENTION

1. Field of the Invention

The present invention relates to an automatic transmission.

2. Description of the Related Art

There are existing automatic transmissions capable of providing eight forward gears by using a first planetary gear mechanism for input, two planetary gear mechanisms for changing speed, and six engagement mechanisms (see, for example, Japanese Unexamined Patent Application Publication No. 2005-273768).

In the automatic transmission described in Japanese Unexamined Patent Application Publication No. 2005-273768, the first planetary gear mechanism for input is a double-pinion-type planetary gear mechanism including a first sun gear, a first ring gear, and a first carrier. The first carrier rotatably and revolvably supports a pair of first pinions that mesh with each other. One of the first pinions meshes with the first sun gear, and the other of the first pinions meshes with the first ring gear.

In the first planetary gear mechanism, the first sun gear is a fixed element fixed to a transmission case, the first carrier is an input element connected to an input shaft, and the first ring gear is an output element that reduces the rotation speed of the first carrier and outputs the rotation.

Each of the two planetary gear mechanisms for changing speed is a Ravigneaux-type planetary gear mechanism including a second sun gear, a third sun gear, a second ring gear that is integrated with a third ring gear, and a second carrier. The second carrier rotatably and revolvably supports a pair of second pinions that mesh with each other. One of the second pinions meshes with the second sun gear and the second ring gear, and the other of the second pinions meshes with the third sun gear.

In a velocity diagram, this Ravigneaux-type planetary gear mechanism has first to fourth rotation elements that are arranged in this order with distances, which correspond to the gear ratios, therebetween. The first rotation element is the second sun gear, the second rotation element is the second carrier integrated with the third carrier, the third rotation element is the second ring gear integrated with the third ring gear, and the fourth rotation element is the third sun gear.

The Ravigneaux-type planetary gear mechanism includes a first engagement mechanism that releasably connects the first ring gear, which is an output element of the first planetary gear mechanism, to the fourth rotation element, which is the third sun gear; a second engagement mechanism that releasably connects the input shaft to the second rotation element, which is the second carrier; a third engagement mechanism that releasably connects the first ring gear, which is an output element, to the first rotation element, which is the second sun gear; a fourth engagement mechanism that releasably connects the first carrier, which is an input element, to the first rotation element, which is the second sun gear; a fifth engagement mechanism that releasably fixes the first rotation element, which is the second sun gear, to the transmission case; and a sixth engagement mechanism that releasably fixes the second rotation element, which is the second carrier, to the transmission case.

With such a structure, a first gear is entered by engaging the first engagement mechanism and the sixth engagement mechanism, a second gear is entered by engaging the first engagement mechanism and the fifth engagement mechanism, a third gear is entered by engaging the first engagement mechanism and the third engagement mechanism, and the fourth gear is entered by engaging the first engagement mechanism and the fourth engagement mechanism.

A fifth gear is entered by engaging the first engagement mechanism and the second engagement mechanism, a sixth gear is entered by engaging the second engagement mechanism and the fourth engagement mechanism, a seventh gear is entered by engaging the second engagement mechanism and the third engagement mechanism, and an eighth gear is entered by engaging the second engagement mechanism and the fifth engagement mechanism. The automatic transmission may have seven forward gears by omitting the first gear or the eighth gear.

In the existing example described above, two engagement mechanisms are engaged in each gear. Therefore, large friction loss is caused by drag of the remaining four engagement mechanisms that are not engaged, so that the efficiency of the transmission is reduced.

SUMMARY OF THE INVENTION

According to an aspect of the invention, an automatic transmission changes rotation of an input shaft rotated by a power of a drive source to have any of a plurality of speeds and outputs the rotation through an output member. The automatic transmission includes a first planetary gear mechanism, a second planetary gear mechanism, a third planetary gear mechanism, a first engagement mechanism, a second engagement mechanism, a third engagement mechanism, a fourth engagement mechanism, a fifth engagement mechanism, and a sixth engagement mechanism. The first planetary gear mechanism includes a first single-pinion planetary gear mechanism including three elements that are a first sun gear, a first ring gear, and a first carrier that rotatably and revolvably supports a first pinion that meshes with the first sun gear and the first ring gear. The first sun gear, the first carrier, and the first ring gear respectively correspond to a first element, a second element, and a third element in a velocity diagram where the first sun gear, the first carrier, and the first ring gear are arranged in an order of distance corresponding to a gear ratio. The second planetary gear mechanism includes a second single-pinion planetary gear mechanism including three elements that are a second sun gear, a second ring gear, and a second carrier that rotatably and revolvably supports a second pinion that meshes with the second sun gear and the second ring gear. The second sun gear, the second carrier, and the second ring gear respectively correspond to a fourth element, a fifth element, and a sixth element in a velocity diagram where the second sun gear, the second carrier, and the second ring gear are arranged in an order of distance corresponding to a gear ratio. The fourth element is connected to the first element of the first planetary gear mechanism to form a first connected body. The third planetary gear mechanism includes a double-pinion planetary gear mechanism including three elements that are a third sun gear, a third ring gear, and a third carrier that rotatably and revolvably supports a pair of third pinions that mesh with each other. One of the pair of third pinions meshes with the third sun gear and another pinion of the pair of third pinions meshes with the third ring gear. The third sun gear, the third carrier, and the third ring gear respectively correspond to a seventh element, an eighth element, and a ninth element in a velocity diagram where the third sun gear, the third carrier, and the third ring gear are arranged in an order of distance corresponding to a gear ratio. The ninth element is connected to the third element of the first planetary gear mechanism to form a second connected body. The eighth element is connected to the fifth element of the second planetary gear mechanism to form a third connected body that is connected to the output member. The first engagement mechanism releasably connects the input shaft to the sixth element. The second engagement mechanism releasably connects the first connected body to the seventh element. The third engagement mechanism releasably connects the input shaft to the second element. The fourth engagement mechanism releasably fixes the sixth element to a transmission case. The fifth engagement mechanism releasably fixes the seventh element to the transmission case. The sixth engagement mechanism releasably fixes the ninth element to the transmission case.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a table illustrating the states of engagement mechanisms in the embodiment for each gear.

DESCRIPTION OF THE EMBODIMENTS

Figure 1:
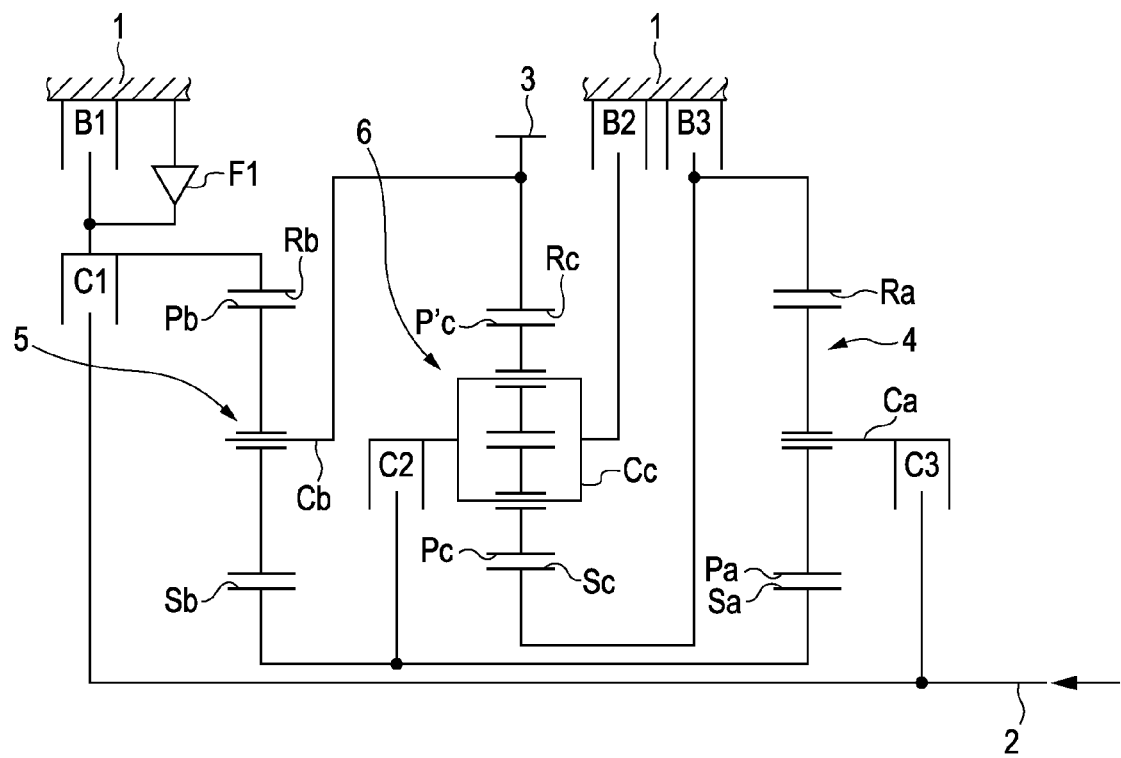
FIG. 1 is a skeleton diagram of an automatic transmission according to an embodiment of the present invention.

The embodiments will now be described with reference to the accompanying drawings, wherein like reference numerals designate corresponding or identical elements throughout the various drawings.

FIG. 1 illustrates an automatic transmission according to a first embodiment of the present invention. The automatic transmission of the first embodiment includes an input shaft 2 and an output member 3. The input shaft 2 is rotatably supported in a transmission case 1 and connected to a power source, such as an engine (not shown). The output member 3 includes an output gear that is disposed coaxially with the input shaft 2. Rotation of the output member 3 is transmitted to left and right driving wheels of a vehicle through a differential gear (not shown).

In the transmission case 1, a first planetary gear mechanism 4, a second planetary gear mechanism 5, and a third planetary gear mechanism 6 are disposed coaxially with the input shaft 2. The first planetary gear mechanism 4 is a single-pinion-type planetary gear mechanism including a sun gear Sa, a ring gear Ra, and a carrier Ca that rotatably and revolvably supports a pinion Pa. The pinion Pa meshes with the sun gear Sa and the ring gear Ra.

Figure 2:
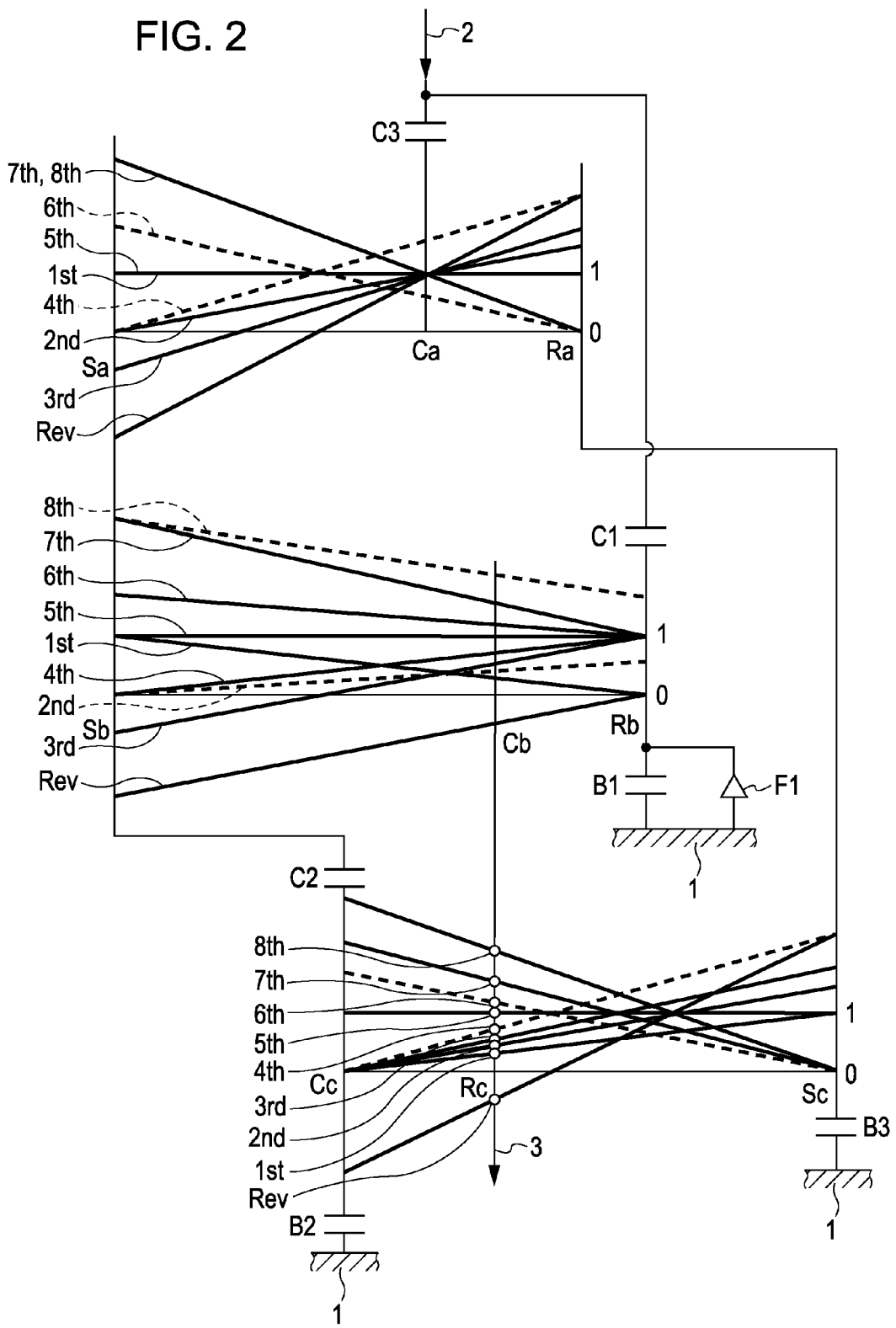
FIG. 2 is a velocity diagram of a planetary gear mechanism in the embodiment.

In the upper part of FIG. 2, a velocity diagram (a diagram illustrating the relationship between the rotation speeds of the sun gear, the carrier, and the ring gear with straight lines) of the first planetary gear mechanism 4 is illustrated. Referring to the velocity diagram, the first planetary gear mechanism 4 has first to third elements that are arranged in this order from the left side with distances, which correspond to the gear ratio, therebetween. The first element is the sun gear Sa, the second element is the carrier Ca, and the third element is the ring gear Ra.

The ratio of the distance between the sun gear Sa and the carrier Ca to the distance between the carrier Ca and the ring gear Ra is i:1, where i is the gear ratio of the first planetary gear mechanism 4 (the number of teeth of the ring gear/the number of teeth of the sun gear). In the velocity diagram, lower and upper horizontal lines respectively represent rotation speeds of "0" and "1" (the same as that of the input shaft 2).

The second planetary gear mechanism 5 is also a single-pinion-type planetary gear mechanism including a sun gear Sb, a ring gear Rb, and a carrier Cb that rotatably and revolvably supports a pinion Pb. The pinion Pb meshes with the sun gear Sb and the ring gear Rb.

In the velocity diagram, the second planetary gear mechanism 5 has fourth to sixth elements that are arranged from the left side in this order with distances, which correspond to the gear ratio, therebetween. The fourth element is the sun gear Sb, the fifth element is the carrier Cb, and the sixth element is the ring gear Rb. The ratio of the distance between the sun gear Sb and the carrier Cb to the distance between the carrier Cb and the ring gear Rb is j:1, where j is the gear ratio of the second planetary gear mechanism 5.

The third planetary gear mechanism 6 is a double-pinion-type planetary gear mechanism including a sun gear Sc, a ring gear Rc, and a carrier Cc that rotatably and revolvably supports a pair of pinions Pc and Pc'. The pinions Pc and Pc' mesh with each other, and one of the pinions meshes with the sun gear Sc and the other of the pinions meshes with the ring gear Rc.

In the lower part of FIG. 2, a velocity diagram of the third planetary gear mechanism 6 is illustrated. Referring to the velocity diagram, the third planetary gear mechanism 6 has seventh to ninth elements that are arranged from the left side in this order with distances, which correspond to the gear ratio, therebetween. The seventh element is the carrier Cc, the eighth element is the ring gear Rc, and the ninth element is the sun gear Sc. The ratio of the distance between the sun gear Sc and the carrier Cc to the distance between the carrier Cc and the ring gear Rc is k:1, where k is the gear ratio of the third planetary gear mechanism 6.

The sun gear Sa (first element) of the first planetary gear mechanism 4 is connected to the sun gear Sb (fourth element) of the second planetary gear mechanism 5 so that a first connected body Sa-Sb is formed. The ring gear Ra (third element) of the first planetary gear mechanism 4 is connected to the sun gear Sc (ninth element) of the third planetary gear mechanism 6 so that a second connected body Ra-Sc is formed. The carrier Cb (fifth element) of the second planetary gear mechanism 5 is connected to the ring gear Rc (eighth element) of the third planetary gear mechanism 6 so that a third connected body Cb-Rc is formed. The third connected body Cb-Rc is connected to the output member 3.

In the automatic transmission of the embodiment, the first to third planetary gear mechanisms 4, 5, and 6 include six rotating bodies, i.e., the first connected body Sa-Sb, the carrier Ca (second element) of the first planetary gear mechanism 4, the second connected body Ra-Sc, the third connected body Cb-Rc, the ring gear Rb (sixth element) of the second planetary gear mechanism 5, and the carrier Cc (seventh element) of the third planetary gear mechanism 6.

The automatic transmission of the embodiment includes first to third clutches C1 to C3, which are wet-type multi-disc clutches, respectively corresponding to first to third engagement mechanisms. The first clutch C1 releasably connects input shaft 2 to the ring gear Rb (sixth element) of the second planetary gear mechanism 5. The second clutch C2 releasably connects the first connected body Sa-Sb to the carrier Cc (seventh element) of the third planetary gear mechanism 6. The third clutch C3 releasably connects the input shaft 2 to the carrier Ca (second element) of the first planetary gear mechanism 4.

The automatic transmission includes first to third brakes B1 to B3, which are wet-type multi-disc brakes, respectively corresponding to fourth to sixth engagement mechanisms. The first brake B1 releasably fixes the ring gear Rb (sixth element) of the second planetary gear mechanism 5 to the transmission case 1. The second brake B2 releasably fixes the carrier Cc (seventh element) of the third planetary gear mechanism 6 to the transmission case 1. The third brake B3 releasably fixes the second connected body Ra-Sc to the transmission case 1.

In the transmission case 1, a one-way clutch F1 is disposed in parallel with the first brake B1. The one-way clutch F1 allows forward rotation (which moves a vehicle forward) and inhibits reverse rotation (which moves a vehicle backward) of the ring gear Rb (sixth element) of the second planetary gear mechanism 5.

In the automatic transmission of the embodiment, when the third clutch C3 and the second brake B2 are engaged, the following occurs. The rotation speed of the carrier Ca (second element) of the first planetary gear mechanism 4 becomes "1", the rotation speed of the carrier Cc (seventh element) of the third planetary gear mechanism 6 becomes "0", and the rotation speed of the ring gear Rb (sixth element) of the second planetary gear mechanism 5 becomes "0" owing to the function of the one-way clutch F1. The velocity line becomes "1st" illustrated in FIG. 2. Thus, the first gear is entered.

At this time, although the first brake B1 is disengaged, the first brake B1 does not cause friction loss because the rotation speed of ring gear Rb (sixth element) of the second planetary gear mechanism 5 is "0" owing to the function of the one-way clutch F1.

Because the automatic transmission of the embodiment includes the one-way clutch F1, when shifting from the first gear to the second gear, it is not necessary to supply hydraulic pressure or stop supplying hydraulic pressure to the first brake B1, so that controllability of shifting from the first gear to the second gear is improved. When the first brake B1 is engaged in addition to the third clutch C3 and the second brake B2, the first gear is entered in a state in which engine braking is available.

When the second clutch C2, the third clutch C3, and the second brake B2 are engaged, the following occurs. The rotation speed of the carrier Ca (second element) of the first planetary gear mechanism 4 becomes "1" and the rotation speeds of the first connected body Sa-Sb and the carrier Cc (seventh element) of the third planetary gear mechanism 6 become "0". The velocity line becomes "2nd" illustrated in FIG. 2. Thus, the second gear is entered.

When the first clutch C1, the third clutch C3, and the second brake B2 are engaged, the following occurs. The rotation speeds of carrier Ca (second element) of the first planetary gear mechanism 4 and the ring gear Rb (sixth element) of the second planetary gear mechanism 5 become "1", and the rotation speed of the carrier Cc (seventh element) of the third planetary gear mechanism 6 becomes "0". The velocity line becomes "3rd" illustrated in FIG. 2. Thus, the third gear is entered.

When the first clutch C1, the second clutch C2, and the second brake B2 are engaged, the following occurs. The rotation speed of the ring gear Rb (sixth element) of the second planetary gear mechanism 5 becomes "1", and the rotation speeds of the first connected body Sa-Sb and the carrier Cc (seventh element) of the third planetary gear mechanism 6 become "0". The velocity line becomes "4th" illustrated in FIG. 2. Thus, the fourth gear is entered.

When the first clutch C1, the second clutch C2, and the third clutch C3 are engaged, the following occurs. The rotation speeds of the carrier Ca (second element) of the first planetary gear mechanism 4 and the ring gear Rb (sixth element) of the second planetary gear mechanism 5 become "1". The first connected body Sa-Sb and the carrier Cc (seventh element) of the third planetary gear mechanism 6 rotate at the same speed.

In this case, the rotation speeds of the elements of the first to third planetary gear mechanisms 4, 5, and 6 can be represented by a velocity diagram including first to fifth rotation elements that are arranged from the left side. The first rotation element is the first connected body Sa-Sb and the carrier Cc (seventh element) of the third planetary gear mechanism 6, the second rotation element is the third connected body Cb-Rc, the third rotation element is the ring gear Rb (sixth element) of the second planetary gear mechanism 5, the fourth rotation element is the carrier Ca (second element) of the first planetary gear mechanism 4, and the fifth rotation element is the second connected body Ra-Sc.

The ratio of the distance between first rotation element and the second rotation element to the distance between the second rotation element and the third rotation element, the distance between the third rotation element and the fourth rotation element, and the distance between the fourth rotation element and the fifth rotation element is $j:1:jk-\{(i+1)(j+1)+jk\}/(i+1):jk/(i+1)$.

Because the rotation speeds of the third rotation element and the fourth rotation element become "1", all the elements of the first to third planetary gear mechanisms 4, 5, and 6 enter locked states in which the elements cannot rotate with respect to each other and the rotation speeds of these elements become "1". Therefore, the velocity line becomes "5th" illustrated in FIG. 2. Thus, the fifth gear is entered.

When the first clutch C1, the second clutch C2, and the third brake B3 are engaged, the following occurs. The rotation speed of the ring gear Rb (sixth element) of the second planetary gear mechanism 5 becomes "1", and the rotation speed of the second connected body Ra-Sc becomes "0". The first connected body Sa-Sb and the carrier Cc (seventh element) of the third planetary gear mechanism 6 rotate at the same speed. The velocity line becomes "6th" illustrated in FIG. 2. Thus, the sixth gear is entered.

When the first clutch C1, the third clutch C3, and the third brake B3 are engaged, the following occurs. The rotation speeds of the carrier Ca (second element) of the first planetary gear mechanism 4 and the ring gear Rb (sixth element) of the second planetary gear mechanism 5 become "1", and the rotation speed of the second connected body Ra-Sc becomes "0". The velocity line becomes "7th" illustrated in FIG. 2. Thus, the seventh gear is entered.

When the second clutch C2, the third clutch C3, and the third brake B3 are engaged, the following occurs. The rotation speeds of the carrier Ca (second element) of the first planetary gear mechanism 4 becomes "1", and the rotation speed of the second connected body Ra-Sc becomes "0". The first connected body Sa-Sb and the carrier Cc (seventh element) of the third planetary gear mechanism 6 rotate at the same speed. The velocity line becomes "8th" illustrated in FIG. 2. Thus, the eighth gear is entered.

When the second clutch C2, the third clutch C3, and the first brake B1 are engaged, the following occurs. The rotation speeds of the carrier Ca (second element) of the first planetary gear mechanism 4 becomes "1", and the rotation speed of the ring gear Rb (sixth element) of the second planetary gear mechanism 5 becomes "0". The first connected body Sa-Sb and the carrier Cc (seventh element) of the third planetary gear mechanism 6 rotate at the same speed. The velocity line becomes "Rev" illustrated in FIG. 2. Thus, the reverse gear is entered.

The velocity lines illustrated with dotted lines in FIG. 2 represent that, when some of the first to third planetary gear mechanisms 4, 5, and 6 rotate so as to transmit power, the elements of the remaining planetary gear mechanisms rotate so as to follow the rotation.

FIG. 3 is a table illustrating the relationship between the gears described above and the states of the engagement mechanisms, which are the clutches C1 to C3 and the brakes B1 to B3. An open circle represents an engaged state. FIG. 3 also illustrates the gear ratio (the rotation speed of the input shaft 2/the rotation speed of the output member 3) for each gear, when the gear ratio i of the first planetary gear mechanism 4 is 1.950, the gear ratio j of the second planetary gear mechanism 5 is 2.577, and the gear ratio k of the third planetary gear mechanism 6 is 3.333. In this case, the step ratios (the ratios between adjacent gear ratios) are appropriate and the ratio ranges (gear ratio of the first gear/gear ratios of the eighth gears), which are illustrated in the cells for the eighth gears, are also appropriate.

The automatic transmission of the embodiment is capable of providing eight forward gears. In each gear, three of the first to six engagement mechanisms, which are the clutches C1 to C3 and the brakes B1 to B3, engage. Therefore, in each gear, three engagement mechanisms are disengaged. As compared with existing transmissions, in which four engagement mechanisms are disengaged, friction loss due to disengaged engagement mechanisms is reduced, so that the efficiency of transmission is improved. For the first gear, the first brake B1 is not taken into account because the first brake B1 does not cause friction loss even when the first brake B1 is disengaged.

It has been described that the automatic transmission of the embodiment has eight forward gears. However, one of the gears may be omitted, and the automatic transmission may have seven forward gears. For example, when the second gear is omitted and the third to eighth gears are regarded as the second to seventh gears, the transmission has seven forward gears.

The automatic transmission of the embodiment includes a one-way clutch F1. However, the one-way clutch F1 may be omitted. In this case, the first brake B1 is to be engaged when the first gear is to be entered.

In the embodiment, the fourth engagement mechanism is the first brake B1, which is a wet-type multi-disc brake. However, the fourth engagement mechanism may be a two-way clutch F2 that can be switched between two states, one state allowing forward rotation and inhibiting reverse rotation of the ring gear Rb (sixth element) of the second planetary gear mechanism 5, the other state inhibiting forward rotation and allowing reverse rotation of the ring gear Rb (sixth element).

In this case, for forward gears, the two-way clutch F2 is to be switched to the state allowing forward rotation and inhibiting reverse rotation of the ring gear Rb (sixth element) of the second planetary gear mechanism 5. For reverse gears, the two-way clutch F2 is to be switched to the state inhibiting forward rotation and allowing reverse rotation of the ring gear Rb (sixth element).

With this structure, as with the structure having the one-way clutch F1, controllability of shifting from the first gear to the second gear is improved. Moreover, the first brake B1 for the reverse gear, which has a comparatively high capacity, can be omitted, so that friction loss can be further reduced and the efficiency of transmission can be improved.

In the embodiment, the fifth engagement mechanism is the second brake B2, which is a wet-type multi-disc brake. However, the fifth engagement mechanism may be a meshing mechanism such as a dog clutch. The meshing mechanism may be a rotation synchronization mechanism such as synchromesh mechanism. The meshing mechanism may be hydraulic or electric. For example, when an electric meshing mechanism is used as the fifth engagement mechanism, friction loss caused in the range of high gears such as the fifth to eighth gears, in which the fifth engagement mechanism is disengaged, is reduced further, the number of hydraulic engagement mechanisms can be further reduced, so that the load to the hydraulic pump (not shown) can be reduced.

As described in the description of the preferred embodiments, the automatic transmission according to the embodiment of the present invention enables seven or more forward gears, and three of the first to sixth engagement mechanisms engage in each gear. Therefore, three engagement mechanisms are disengaged in each gear. As compared with existing automatic transmissions in which four engagement mechanisms are disengaged, friction loss caused by disengaged engagement mechanisms can be reduced so that the efficiency of transmission is improved.

It is preferable that the automatic transmission according to the embodiment of the present invention include a one-way clutch that allows forward rotation (which moves a vehicle forward) and inhibits reverse rotation (which moves a vehicle backward) of the sixth element. With this structure, the first gear can be entered without engaging the fourth engagement element. As compared with the case in which the transmission mechanism does not include a one-way clutch, controllability of shifting between the first gear and the second gear can be improved.

It is preferable that the fourth engagement mechanism of the automatic transmission according to the embodiment of the present invention be a two-way clutch that can be switched between a first state and a second state, the first state allowing forward rotation and inhibiting reverse rotation of the sixth element, the second state inhibiting forward rotation and allowing reverse rotation of the sixth element. Also with this structure, controllability of shifting between the first gear and the second gear can be improved. Moreover, a wet-type multi-disc brake for the reverse gear, which has a comparatively high capacity, can be omitted, so that friction loss can be further reduced and the efficiency of transmission can be further improved.

The fifth engagement mechanism of the automatic transmission according to the embodiment of the present invention may be a meshing mechanism. With this structure, the number of hydraulic engagement mechanisms can be reduced, so that the load to a hydraulic pump can be reduced.

Obviously, numerous modifications and variations of the present invention are possible in light of the above teachings. It is therefore to be understood that within the scope of the appended claims, the invention may be practiced otherwise than as specifically described herein.

What is claimed is:

1. An automatic transmission that changes rotation of an input shaft rotated by a power of a drive source to have any of a plurality of speeds and outputs the rotation through an output member, the automatic transmission comprising:
 a first planetary gear mechanism comprising a first single-pinion planetary gear mechanism including three elements that are a first sun gear, a first ring gear, and a first carrier that rotatably and revolvably supports a first pinion that meshes with the first sun gear and the first ring gear, the first sun gear, the first carrier, and the first ring gear respectively corresponding to a first element, a second element, and a third element in a velocity diagram where the first sun gear, the first carrier, and the first ring gear are arranged in an order of distance corresponding to a gear ratio;

a second planetary gear mechanism comprising a second single-pinion planetary gear mechanism including three elements that are a second sun gear, a second ring gear, and a second carrier that rotatably and revolvably supports a second pinion that meshes with the second sun gear and the second ring gear, the second sun gear, the second carrier, and the second ring gear respectively corresponding to a fourth element, a fifth element, and a sixth element in a velocity diagram where the second sun gear, the second carrier, and the second ring gear are arranged in an order of distance corresponding to a gear ratio, the fourth element being connected to the first element of the first planetary gear mechanism to form a first connected body;

a third planetary gear mechanism comprising a double-pinion planetary gear mechanism including three elements that are a third sun gear, a third ring gear, and a third carrier that rotatably and revolvably supports a pair of third pinions that mesh with each other, one of the pair of third pinions meshing with the third sun gear and another pinion of the pair of third pinions meshing with the third ring gear, the third carrier, the third ring gear, and the third sun gear respectively corresponding to a seventh element, an eighth element, and a ninth element in a velocity diagram where the third sun gear, the third carrier, and the third ring gear are arranged in an order of distance corresponding to a gear ratio, the ninth element being connected to the third element of the first planetary gear mechanism to form a second connected body, the eighth element being connected to the fifth element of the second planetary gear mechanism to form a third connected body that is connected to the output member;

a first engagement mechanism that releasably connects the input shaft to the sixth element;

a second engagement mechanism that releasably connects the first connected body to the seventh element;

a third engagement mechanism that releasably connects the input shaft to the second element;

a fourth engagement mechanism that releasably fixes the sixth element to a transmission case;

a fifth engagement mechanism that releasably fixes the seventh element to the transmission case; and a sixth engagement mechanism that releasably fixes the second connected body to the transmission case.

2. The automatic transmission according to claim 1, further comprising:

a one-way clutch configured to allow forward rotation of the sixth element and inhibit reverse rotation of the sixth element.

3. The automatic transmission according to claim 2, wherein the fifth engagement mechanism comprises a meshing mechanism.

4. The automatic transmission according to claim 1, wherein the fourth engagement mechanism comprises a two-way clutch switchable between a first state in which forward rotation of the sixth element is allowed and reverse rotation of the sixth element is inhibited and a second state in which forward rotation of the sixth element is inhibited and reverse rotation of the sixth element is allowed.

5. The automatic transmission according to claim 4, wherein the fifth engagement mechanism comprises a meshing mechanism.

6. The automatic transmission according to claim 1, wherein the fifth engagement mechanism comprises a meshing mechanism.

* * * * *